United States Patent [19]

Koenig et al.

[11] Patent Number: 4,653,796

[45] Date of Patent: Mar. 31, 1987

[54] SPRING MOUNT FOR VEHICLE BODIES

[75] Inventors: Richard F. Koenig; Albert Klopfenstein; C. Leon Sockwell, all of Houston, Tex.

[73] Assignee: Koenig, Inc., Houston, Tex.

[21] Appl. No.: 800,786

[22] Filed: Nov. 22, 1985

[51] Int. Cl.[4] .............................................. B62D 23/00
[52] U.S. Cl. .................................... 296/35.1; 296/204
[58] Field of Search ....................... 296/35.1, 204, 190

[56] References Cited

U.S. PATENT DOCUMENTS

| 2,754,146 | 7/1956 | Feil, Jr. | 296/35.1 |
| 2,882,090 | 4/1959 | Sewelin | 296/35.1 |
| 2,901,284 | 8/1959 | Page | 296/35.1 |
| 3,834,754 | 9/1974 | Zajichek | 296/35.1 |

FOREIGN PATENT DOCUMENTS 817947 8/1959 United Kingdom .

Primary Examiner—Robert R. Song

Attorney, Agent, or Firm—Dula, Shields & Egbert

[57] ABSTRACT

A front end mount for a service body to a cab chassis of a truck comprising a first crossmember fixedly fastened to the forward portion of the floor of the service body and extending along the width of the floor and a second crossmember fixedly fastened to the frame at a location corresponding to the location of the first crossmember. The first crossmember is received by the second crossmember such that the vertical movement of said first crossmember is restricted by the shape of the second crossmember. The second crossmember has two parallel sections which define the line of travel of the first crossmember relative to the second crossmember. The second crossmember has a section extending horizontally inward from the end of one of the parallel sections opposite the frame. First and second stops are affixed to the first crossmember generally about the ends of the second crossmember so as to restrict the lateral travel of the second crossmember relative to the first crossmember.

24 Claims, 6 Drawing Figures

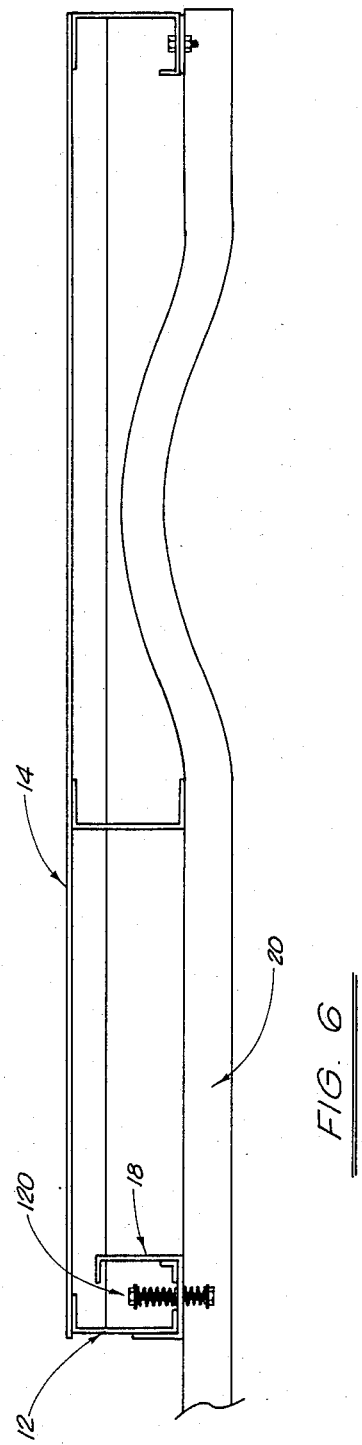

SPRING MOUNT FOR VEHICLE BODIES

FIELD OF THE INVENTION

The present invention relates to apparatus for the attachment of vehicle bodies to vehicle frames. More particularly, the present invention relates to front spring mounts for reducing stress to a vehicle body from forces applied to the frame.

BACKGROUND ART

Trucks in the service industry have a configuration in which a service body is mounted to a cab chassis. In prior-art applications, the service body is attached rearward of the cab and directly onto the frame of the vehicle. The service body has a specially designed configuration which suits a particular purpose in various service industries.

In the past, the service body was directly and rigidly mounted to the frame of the vehicle. For smaller service vehicles, there has been no structure for reducing the impact to the service body from frame movements. Since the service body is rigidly attached to the frame, shocks that are absorbed by the frame are passed directly into the service body. As a result, the service body may quickly deteriorate, tear, crack, or otherwise require replacement.

It is an object of the present invention to provide an improved spring mount that increases the off-road capability of the service vehicle.

It is another object of the present invention to improve the durability of the service body.

It is another object of the present invention to provide these benefits by a relatively inexpensive front end spring mount.

These and other objects and advantages of the present invention will become apparent from a reading of the attached specification and appended claims.

DISCLOSURE OF THE INVENTION

The present invention is an improved spring mount for vehicles having a body and frame comprising a first crossmember fixedly fastened to the body and extending along a portion of the width of the body and a second crossmember fixedly fastened to the frame and engaging the first crossmember such that the vertical movement of one of the cross members is restricted by the shape of the other crossmember. The second crossmember extends along the width of the frame.

The first crossmember comprises a generally horizontal first portion which is fastened to the body in a face-to-face relationship, a second portion extending vertically downward from the first portion, and a third portion extending horizontally from the second portion and in plane parallel with the first portion.

The second crossmember comprises a first section which is generally horizontal and fastened to the frame in a face-to-face relationship, a second section extending vertically upward from one side of the first section, and a third section extending vertically upward from the other side of the first section. The second and third sections of the second crossmember form walls which restrict the direction of travel of the first crossmember. The second crossmember also has a fourth section which extends horizontally inward from the third section and serves to restrict the length of travel of the first crossmember within the second crossmember.

The present invention further comprises a first stop member rigidly affixed to the first crossmember about one end of the second crossmember and a second stop rigidly affixed to the first crossmember about the other end of the second crossmember. Elongated slots extend longitudinally along the first crossmember. The second crossmember is bolted to the frame through these slots. Springs are attached to the first crossmember and second crossmember so as to urge the first crossmember in abutment with the second crossmember.

BRIEF DESCRIPTION OF THE DRAWINGS

FIG. 6 is a side view in partial section of the spring arrangement of the present invention.

BEST MODE FOR CARRYING OUT THE INVENTION

Figure 1:
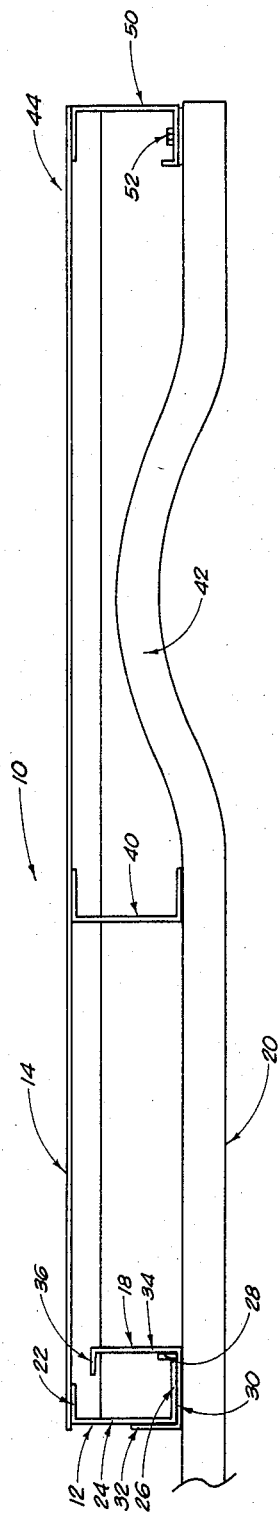
FIG. 1 is a view in side elevation of the improved spring mount of the present invention.

Referring to FIG. 1, there is shown at 10 the improved spring mount of the present invention. Specifically, in FIG. 1, first crossmember 12 is fixedly fastened to the floor 14 of body of a vehicle. In particular, this body may be the service body of a truck. Second crossmember 18 is fixedly fastened to frame 20 of the vehicle. Frame 20 is the chassis of a truck. As shown in FIG. 1, the first crossmember 12 and the second crossmember 18 are fastened to the frame at a location just rearward of the cab of the service truck. While the present invention is shown in application to a service truck, this is not intended as a limitation on the present invention. The present invention could also be utilized, in different configurations, with standard truck or automobile bodies.

First crossmember 12 is fastened by welding, bolting, or other means to the bottom of floor 14. First crossmember 12 has a first portion 22 that is generally horizontal and fastened to the floor 14 in a face-to-face relationship. A second portion 24 extends vertically downward from the first portion 22. A third portion 26 extends horizontally inward from the second portion 24 and is in plane parallel with the first portion 22. This third portion 26 is adjacent and in face-to-face relationship with a portion of second crossmember 18. A fourth portion 28 extends vertically upwardly from the third portion 26 of first crossmember 12. Each of these portions of first crossmember 12 is part of a unitary configuration of crossmember 12. Crossmember 12 is made of seven gauge steel which is approximately 3/16" thick. Each of the portions of crossmember 12 may be formed on an appropriate brake press.

Figure 4:
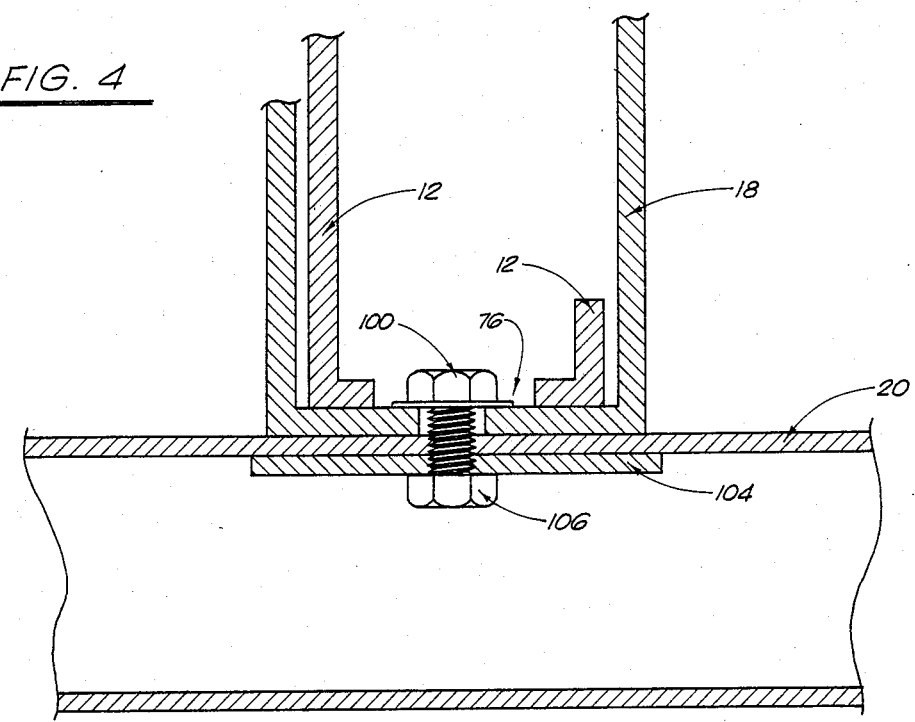
FIG. 4 is a magnified and cross sectional view of the internal arrangement of the spring mount of the present invention.
Figure 5:
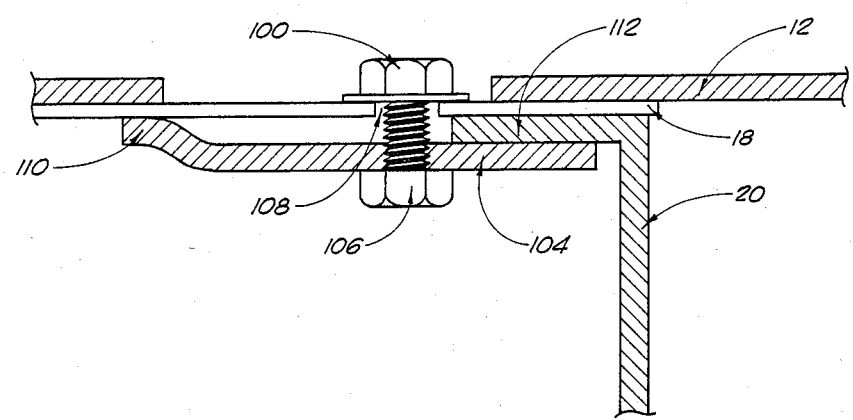
FIG. 5 is an end view of the mounting bolt arrangement of FIG. 4.

Second crossmember 18 is fastened to frame 20 and receives first crossmember 12 such that the vertical movement of the first crossmember is restricted by the shape of second crossmember 18. Second crossmember 18 has a first section 30 which is generally horizontal and fastened to the upper surface of frame 20 in a face-to-face relationship. Section 30 is fastened to frame 20 by bolting, as is shown in FIGS. 4 and 5. A second section 32 extends vertically upward from one side of first section 30 and is adjacent to portion 24 of first crossmember 12. A third section 34 extends vertically upward from the other side of first section 30 and is in plane parallel with section 32. Section 34 is adjacent to fourth portion 28 of first crossmember 12. A fourth section 36 extends horizontally inward from third section 34. Fourth section 36 serves to limit the length of travel of first crossmember 12 in second crossmember 18. The length of travel which is limited by fourth section 36 is between one and three inches. Second crossmember 18 is formed and manufactured in a manner similar of first crossmember 12. A clearance of ⅛" is present between the walls of first crossmember 12 and second crossmember 18.

The improved spring mount 10, as shown in FIG. 1, further includes a support member 40 which is positioned to the forward side of wheel well 42 of frame 20. Support member 40 is fastened, at one side, to floor 14. The other side of support member 40 generally abuts, but is not fastened to, frame 20. Support member 40 is a generally C-shaped member.

The rearward portion 44 of the improved spring mount of the present invention is a standard assembly. Crossmember 50 is rigidly fastened to floor 14 at one side and to frame 20 at the other side. Crossmember 50 is fastened to frame 20 by bolt 52.

Figure 2:
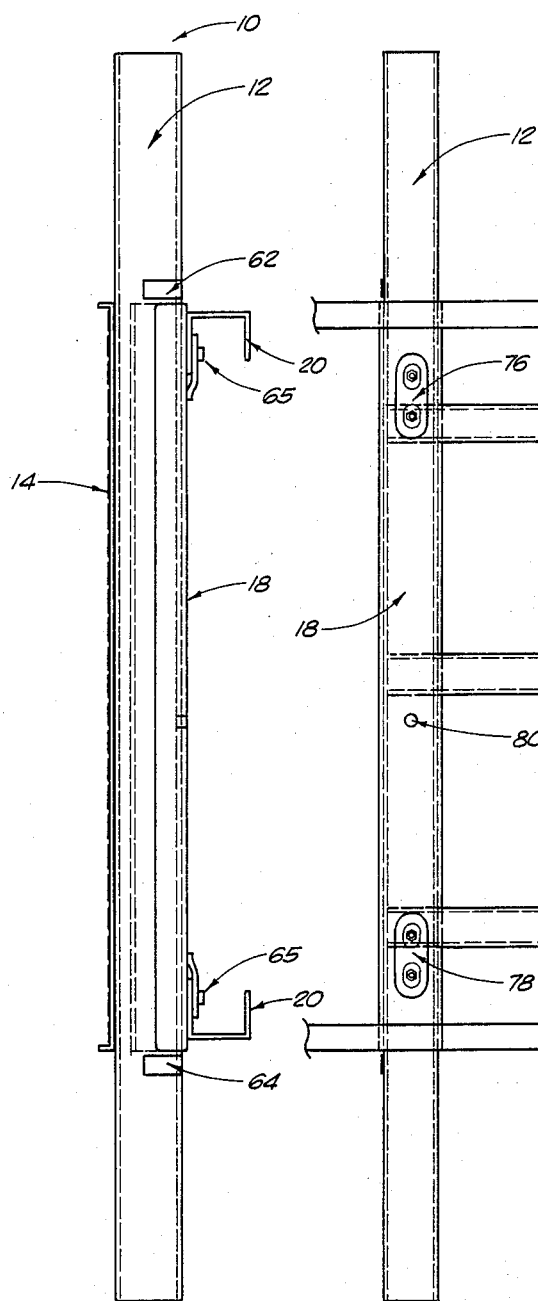
FIG. 2 is a front view of the improved spring mount of the present invention.

FIG. 2 is a frontal view of the front end mount 10 of the present invention. In FIG. 2, there is shown the first crossmember 12. The stops 62 and 64 are welded, or otherwise fixedly fastened, to the first crossmember 12. These stops 62 and 64 are approximately one quarter inch thick pieces of steel and are fastened so as to allow ⅛" of clearance with the ends of second crossmember 18. These stops 62 and 64 are arranged so as to restrict the lateral travel of the first crossmember relative to the second crossmember. Floor 14 is shown fastened to the first crossmember 12.

Figure 3:
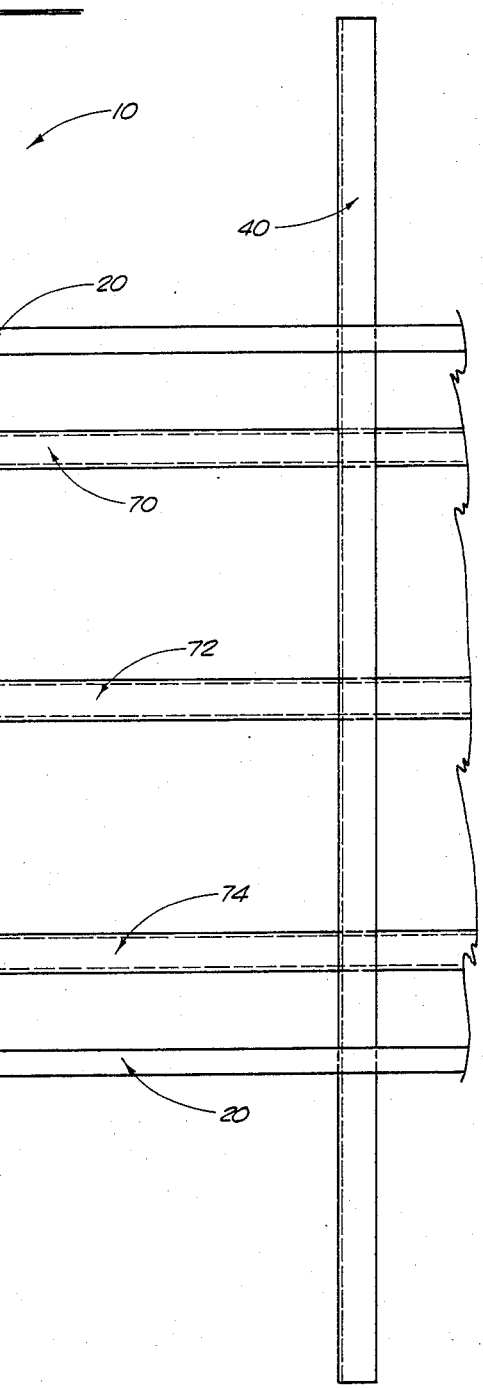
FIG. 3 is a plan view from the underside of the frame of the present invention.

In FIG. 3 the underside of the present invention 10 is shown. FIG. 3 shows front crossmember 12 at one end, and longitudinal members 70, 72 and 74 extending perpendicular therefrom. Longitudinal members 70, 72 and 74 support the floor 14 of the body of the vehicle. Support member 40 is arranged just forward of the wheel wells of the vehicle. As shown in FIG. 3, two elongated slots 76 and 78 extend about the first crossmember. The slots 76 and 78 are formed in the third portion 26 of the first crossmember. Slots 76 and 78 allow bolts to be inserted such that the second crossmember 18 may be bolted to the frame 20. A hole 80 is provided about the first crossmember 12 and second crossmember 18 so as to permit the introduction of a spring, or other compression means.

FIG. 4 is a close-up illustration of the arrangement of the first crossmember and the second crossmember at the location of the mounting bolt. In FIG. 4, first crossmember 12 is shown positioned within second crossmember 18. A clearance is shown with the first and second crossmembers. Second crossmember 18 is mounted to frame 20 by bolt 100. Bolt 100 fastens second crossmember 18 to frame 20 by way of clamp 104 and nut 106. Bolt 100 extends through an opening in second crossmember 18 and in clamp 104. Nut 106 is threadedly attached and tightened upon bolt 100. The compressive force exerted by nut 106 onto clamp 104 causes second crossmember 18 to be maintained in juxtaposition to frame 20. A suitable clearance between first crossmember 12 and the head portion of bolt 100 is provided by the area of elongated slot 76. As movement occurs between first crossmember 12 and second crossmember 18, first crossmember 12 will move without restriction by bolt 100. Slot 76 provides clearance for the simple insertion of tools and removal of bolt 100.

FIG. 5 provides a more detailed view of the mounting arrangement between bolt 100, second crossmember 18, frame 20, clamp 104, and nut 106. Crossmember 18 has a hole 108 having a diameter greater than the diameter of the threaded portion of bolt 100. Clamp 104 is a generally flat member having an indented end 110. Clamp 104 maintains a face-to-face relationship with the bottom surface of the upper portion of frame 20. The indented end 110 has a flat surface which abuts crossmember 18. Clamp 104 also has a hole (not shown) which receives the threaded section of bolt 100. When nut 106 is tightened about the theaded section of bolt 100, clamp 104 is forced into an abutting relationship with frame 20 on one side and crossmember 18 on the other side.

FIG. 6 shows the spring arrangement of the present invention. In particular, the embodiment of FIG. 6 shows a spring assembly 120 arranged so as to be interactive between the first crossmember 12 and the second crossmember 18. Spring assembly 120 includes a compression spring which acts on the first crossmember 12 and the second crossmember 18 so as to urge the crossmembers to abut. The addition of this spring prevents rattling and banging when the vehicle encounters minor bumps and changes of terrain.

The operation of the present invention may be shown with reference to FIG. 1. In normal operation, when the vehicle travels over uneven roads or terrain, forces applied by the vehicle's tires and suspension cause the frame 20 to twist. The present invention prevents most or all of the twisting forces from being applied to the body of the vehicle. Specifically, first crossmember 12 will move upwardly within the area defined by second crossmember 18. This allows the frame of the truck to twist while maintaining the stability of the service body. This eliminates much of the stress which would otherwise act upon the body. By eliminating the stress, the body should have a longer life and be resistant to deformations and cracks. Because of this extra movement, the service vehicle is more suitable to off-road applications. Bumps and changes in terrain would have little damaging impact to the service body of the vehicle.

The foregoing disclosure and description of the invention are illustrative and explanatory thereof, and various changes in the details of the illustrative apparatus may be made within the scope of the appended claims without departing from the true spirit of the invention. The embodiments shown above are illustrative only and are not intended to limit the scope of the present invention, which should be interpreted only according to the appended claims and their legal equivalents.

I claim:

1. An improved spring mount for vehicles having a body and a frame comprising:
   a first crossmember fixedly fastened to said body and extending along a portion of the width of said body; and
   a second crossmember fixedly fastened to said frame and extending along the width of said frame, said second crossmember slidingly engaging said first crossmember so as to allow relative vertical movement between said first crossmember and said second crossmember, the vertical movement in both directions of one of said crossmembers is restricted by the shape of said crossmembers.

2. The spring mount of claim 1, said first crossmember comprising:
- a first portion being generally horizontal and fastened to said body in a face-to-face relationship;
- a second portion extending vertically downward from said first portion; and
- a third portion extending horizontally from said second portion and in plane parallel with said first portion.

3. The spring mount of claim 1, said second crossmember comprising:
- a first section being generally horizontal and fastened to said frame in a face-to-face relationship;
- a second section extending vertically upward from one side of said first section; and
- a third section extending vertically upward from the other side of said first section, said third section in plane parallel with said second section.

4. The spring mount of claim 2, said third portion of said first crossmember abutting said second crossmember in a generally face-to-face relationship.

5. The spring mount of claim 3, said second section and said third section of said second crossmember forming walls restricting the direction of travel of said first crossmember therebetween.

6. The spring mount of claim 3, said second crossmember further comprising:
- a fourth section extending horizontally inward from said third section, said fourth section at the side of said third section opposite said first section.

7. The spring mount of claim 6, said fourth section arranged so as to restrict the length of travel of said first crossmember within said second crossmember.

8. The spring mount of claim 2, said first crossmember further comprising:
- a fourth portion extending vertically upwardly from said third portion, said fourth portion being in generally face-to-face relationship with a section of said second crossmember.

9. The spring mount of claim 1, further comprising:
stop means rigidly fastened to said first crossmember about the ends of said second crossmember for restricting the lateral travel of said first crossmember relative to said second crossmember.

10. The spring mount of claim 9, said stop means comprising:
- a first stop rigidly affixed to one end of said first crossmember; and
- a second stop rigidly affixed to the other end of said first crossmember, said first and second stops extending a distance beyond the ends of said second crossmember.

11. The spring mount of claim 2, said third portion of said first crossmember having an elongated slot extending longitudinally along said first crossmember, said second crossmember being bolted to said frame, said slot of said first crossmember having a size sufficient for clearance over the head of a bolt fastening said second crossmember to said frame.

12. The spring mount of claim 1, further comprising:
compression means attached to said first crossmember so as to urge said first crossmember in abutment with said second crossmember.

13. The spring mount of claim 1, said shape of said crossmembers being such as to restrict the vertical movement in both directions of one of said crossmembers within the other of said crossmembers to between one and three inches.

14. A front end mount for a service body to a cab chassis of a truck, said service body having a floor extending along a portion of the frame of said cab chassis, said improved front end mount comprising:
- a first crossmember fixedly fastened to the forward portion of said floor of said service body, said first crossmember extending along a portion of the width of said floor; and
- a second crossmember fixedly fastened to said frame at a location corresponding to the location of said first crossmember, said second crossmember extending along the width of said frame, said first crossmember slidingly received by said second crossmember so as to allow relative vertical movement between said first crossmember and said second crossmember, the vertical movement in both directions of said first crossmember is restricted by the shape of said first and second crossmembers.

15. The front end mount of claim 14, said first and second crossmembers having generally similar shapes.

16. The front end mount of claim 14, said second crossmember having two parallel sections which define the line of travel of said first crossmember relative to said second crossmember.

17. The front end mount of claim 16, said second crossmember having a section extending horizontally inward from the end of one of said parallel sections opposite said frame, said section restricting the relative amount of vertical travel between said first crossmember and said second crossmember.

18. The front end mount of claim 14, further comprising:
stop means rigidly fastened to said first crossmember generally about the ends of said second crossmember so as to restrict the lateral travel of said second crossmember relative to said first crossmember.

19. The front end mount of claim 14, further comprising:
compression means attached to said second crossmember so as to urge said second crossmember in abutment with said first crossmember.

20. The front end mount of claim 14, further comprising:
a support member rigidly fastened to said floor of said service body and extending downwardly from said floor, the end of said support member opposite said floor being generally adjacent to said frame.

21. An improved spring mount for vehicles having a body and a frame comprising:
a first crossmember fixedly fastened to said body and extending along a portion of the width of said body, said first crossmember comprising:
- a first portion being generally horizontal and fastened to said body in a face-to-face relationship;
- a second portion extending vertically downward from said first portion; and
- a third portion extending horizontally from said second portion and in plane parallel with said first portion; and
a second crossmember fixedly fastened to said frame and extending along the width of said frame, said second crossmember slidingly engaging said first crossmember so as to allow relative vertical movement between said first crossmember and said second crossmember, the vertical movement in both directions of one of said crossmembers is restricted by the shape of the other of said crossmembers, said third portion of said first crossmember abutting said second crossmember in a generally face-to-face relationship, said second crossmember comprising:
  a first section being generally horizontal and fastened to said frame in a face-to-face relationship;
  a second section extending vertically upward from one side of said first section; and
  a third section extending vertically upward from the other side of said first section, said third section in plane parallel with said second section.

22. The spring mount of claim 21, said second crossmember further comprising:
  a fourth section extending horizontally inward from said third section, said fourth section at the side of said third section opposite said first section.

23. An improved spring mount for vehicles having a body and a frame comprising:
  a first crossmember fixedly fastened to said body and extending along a portion of the width of said body;
  a second crossmember fixedly fastened to said frame and extending along the width of said frame, said second crossmember slidingly engaging said first crossmember so as to allow relative vertical movement between said first crossmember and said second crossmember, the vertical movement in both directions of one of said crossmembers being restricted by the shape of the other of said crossmembers; and
  stop means rigidly fastened to said first crossmember at the ends of said second crossmember for restricting the lateral travel of said first crossmember relative to said second crossmember.

24. An improved spring mount for vehicles having a body and a frame comprising:
  a first crossmember fixedly fastened to said body and extending along a portion of the width of said body;
  a second crossmember fixedly fastened to said frame and extending along the width of said frame, said second crossmember slidingly engaging said first crossmember so as to allow relative vertical movement between said first crossmember and said second crossmember, vertical movement in both directions of one of said crossmembers being restricted by the shape of the other of said crossmembers; and
  compression means attached to said first crossmember so as to urge said first crossmember in abutment with said second crossmember.

* * * * *